Patented Sept. 7, 1943

2,329,080

UNITED STATES PATENT OFFICE 2,329,080

METHOD OF TREATING SOYBEANS

Charles A. Raymond, Marion, Ohio

No Drawing. Application December 2, 1939,
Serial No. 307,323

2 Claims. (Cl. 99—98)

This invention relates to an improved method of producing edibles or confections and more particularly to a process of rendering grains, nuts or seeds edible.

An object of this invention is to provide an improved process or method whereby the inherent oils in grains, nuts or seeds are removed so as to thereby render the grains or nuts readily digestible.

Another object of this invention is to provide an improved process or method which includes as one step the removal of the raw taste and the chlorophyll coloring matter by subjecting the material to par-boiling in water with sodium bicarbonate and then subjecting the material to an expansive or explosive step wherein the body of each article is increased in size.

A further object of this invention is to provide as a new article of manufacture, a palatable and digestible nut product from a soy bean wherein the undesirable properties in the bean have been removed, the bean being so cooked that it attains a crisp or crunchy condition.

A further object of this invention is to provide an improved method or process which can be used with various kinds of grains, beans, nuts, seeds or the like for making a normally unpalatable or hard to digest product palatable, tasty and easy to digest.

A further object of this invention is to provide an improved method or process which will eliminate the indigestible oils or other elements from the article in addition to the moisture in the article, the fatty cells of the article being broken up through an explosive or expansive step so as to give the article a puffed or enlarged condition.

A further object of this invention is to provide an improved method or process wherein the article is initially par-boiled and then subjected to treatment under pressure in a closed receptacle or tank at a predetermined temperature for a predetermined period of time for removal of the oils from the article.

A further object of this invention is to provide an improved method or process wherein the articles are subjected to agitation in an least one step thereof so as to thoroughly impregnate the article with the explosive or expansive ingredient and at the same time remove a portion of the oils.

A further object of this invention is to provide an improved process for making edible a product which normally is unpalatable including a step whereby the sprout of the product is separated therefrom, reducing the possibility of the product becoming rancid.

As an example, the hereinafter described method or process has been used with a selected grade of soy bean, but it will be undeerstood that this method or process may be used with equal facility with other grains, beans, nuts or seeds, the resultant product being a palatable, tasty, crisp and crunchy edible.

The selected soy beans are washed in clean or clear water of substantially room temperature, the washing taking place in a receptacle which, if desired, may be subjected to movement so as to thoroughly wash the exterior of the bean. The water is then drained from the beans.

The washed beans are then placed in a kettle or receptacle and covered with water, the depth of the water being in excess of the depth of the beans. Sodium bicarbonate is added to the water in a quantity to provide a concentration of 0.265%. The concentration of 0.265% of sodium bicarbonate is an average concentration, and may be increased or decreased depending upon the condition of the bean or other article which is being treated. The solution is then par-boiled for approximately one hour, the length of the par-boiling period depending upon the physical condition of the bean. The moisture content and the age of the bean play an important factor in the par-boiling period.

When the beans have been par-boiled, they are drained of the solution and immediately washed with cool or cold water until the beans are cooled. The beans are next placed in a receptacle and covered with a mixture of sweetened water, and ammonium bicarbonate. The beans are left in this solution for a period of about four hours, during which time the beans may or may not be subjected to constant or periodic agitation, the use of agitation depending upon the character of the vessel in which the beans and solution are placed. This solution is maintained at a temperature of 190 degrees F.

Varying degrees of agitation will not only effect varying depths of penetration of the solution, but will also have the effect of removing or washing out a considerable quantity of the oils.

Another step which may be used as a substitute for the soaking or penetration step contemplates the use of the sweetened solution of ammonium bicarbonate which is placed with the beans in a pressure tank. The beans and the solution are subjected to a pretermined pressure by forcing air into the tank. To assist in the desired penetration of the beans the beans may be subjected to agitation, either constant or periodic. After the beans have been in the solution the required time for penetration and action on the bean oil, protein, etc., the solution and the beans are gradually brought up to a temperature of approximately 190 degrees F. If the air pressure method were used on the beans this is released before subjecting to this heating.

While the penetrating solution has been stated as being subjected to heat, this solution may be used at room temperature or as a cold solution as a quantity of oil will be removed from the bean in this solution either with or without agitation, and experiments have also shown that oils will be removed either with or without heat.

The use of the sweetening agent in this solution not only increases the carbohydrate content but also adds a flavor to the bean which will be retained by the bean in the subsequent treatment thereof.

The beans in the solution of sweetened water and ammonium bicarbonate will absorb sufficient of the solution so that the fatty and other cells of the bean will expand and explode under subsequent treatment, and will render the meat or body structure of the bean readily frangible. Where sugar is used this solution is prepared in the following proportions:

14 grams of invert sugar are dissolved in 500 grams of water, and to this solution 80 grams of ammonium bicarbonate are added and dissolved in the solution.

Where for dietetic reasons it is not desirable to use sugar, saccharine or other sweetening agent may be substituted for sugar. The sweetening agent may if desired be eliminated as the use of this agent is in part to impregnate the bean with a sweetened flavor.

When the beans are placed in the receptacle or tank sufficient solution is added to just cover the beans. The length of time the beans are left in this sugar solution will determine the texture of the final product. The sugar-ammonium-bicarbonate solution will penetrate the inner cellular structure of the bean wherein the ammonium bicarbonate will provide the necessary vehicle for driving out the oils without crushing the body texture of the bean.

As another alternative, the bean may be placed in an impregnating solution which may, if desired, be sweetened and which is placed in a pressure tank where the mass is subjected to air pressure. While the mass is being subjected to air pressure, the mass may also be subjected to agitation to facilitate the penetration of the solution. The beans may be left in the solution under pressure for a period up to about four hours, although the use of air pressure will have the effect of shortening the penetrating period.

After the solution in the pressure tank has penetrated to the extent desired, the pressure may be released, and the mass then subjected to heat slightly above 212 degrees F. so as to form steam and cause the moisture in the bean to place the body of the bean under an internal pressure.

The beans which are treated in either of the foregoing steps are then drained of the sugar solution and placed in a wire mesh or perforate basket. A vegetable oil or fat is then heated to a temperature of 340 to 350 degrees F. The placement of the beans and basket in the hot oil will reduce the temperature of the oil to about 220 degrees F. The temperature of the oil and beans is then raised to about 320 degrees F. The temperature of the oil is gradually raised from about 220 degrees F. to about 320 degrees F., the time requiring about twenty minutes, this time being variable according to the quantity of beans in the oil and the quantity of oil, and may also vary with different heating methods and devices.

The immersing of the beans in the hot oil causes the penetrated ammonium bicarbonate to gasefy and to expand quickly, thereby breaking down the oil cells and forcing the oil to the surface where it will be absorbed in or mixed with the hot vegetable oil.

The beans are removed from the hot oil before they can absorb any of the vegetable oil or reabsorb the oils driven off by the ammonium bicarbonate. The oil is then drained from the now enlarged beans wherein the oil cells are broken, and after being cooled they may be salted or otherwise seasoned.

The process hereinbefore described produces a whole bean having a brownish color or roasted appearance, the color being evenly distributed throughout the body of the bean. The whole processed bean may be eaten in either a seasoned or unseasoned condition.

The effect of the exploding or expansion of the bean in the hot fat is that the skin or shell of the bean is usually cracked or blown off entirely from the body of the bean, and in addition the sprout is separated from the body. The effect of the separation of the sprout or root germ from the bean is that the danger of rancidity is greatly reduced, and the oil in the sprout is also removed.

What I claim is:

1. The process of making soy beans palatable and readily digestible which includes washing the bean in water, par-boiling the bean in a dilute solution of sodium bicarbonate in water for approximately one hour, washing the bean in cool water, impregnating the bean by soaking the same in a dilute solution of ammonium bicarbonate in water for approximately four hours under a predetermined air pressure, heating the bean to a temperature slightly above 212° F. for a sufficient time to place the bean cells under an internal expansive steam pressure, and finally immersing the bean in a hot oil bath varying in temperature from 220° F. to 320° F. for a period of about twenty minutes thereby breaking down the oil cells of the bean by the gasefying of the ammonium bicarbonate.

2. The process of making soy beans palatable and readily digestible which includes washing the bean in water, par-boiling the bean in a concentrate of approximately 0.265% of sodium bicarbonate in water for approximately one hour, washing the bean in cool water, impregnating the bean by soaking the same in a concentrate of approximately 14% of ammonium bicarbonate in water for approximately four hours under a predetermined air pressure, heating the bean to a temperature slightly above 212° F. for a sufficient time to place the bean cells under an internal expansive steam pressure, and finally immersing the bean in a hot oil bath varying in temperature from 220° F. to 320° F. for a period of about twenty minutes thereby breaking down the oil cells of the bean by the gasefying of the ammonium bicarbonate.

CHARLES A. RAYMOND.